N. A. BURGESS.
APPARATUS FOR FILTERING VALUABLE COMPOUNDS.
APPLICATION FILED SEPT. 3, 1913.
1,103,345.  Patented July 14, 1914.
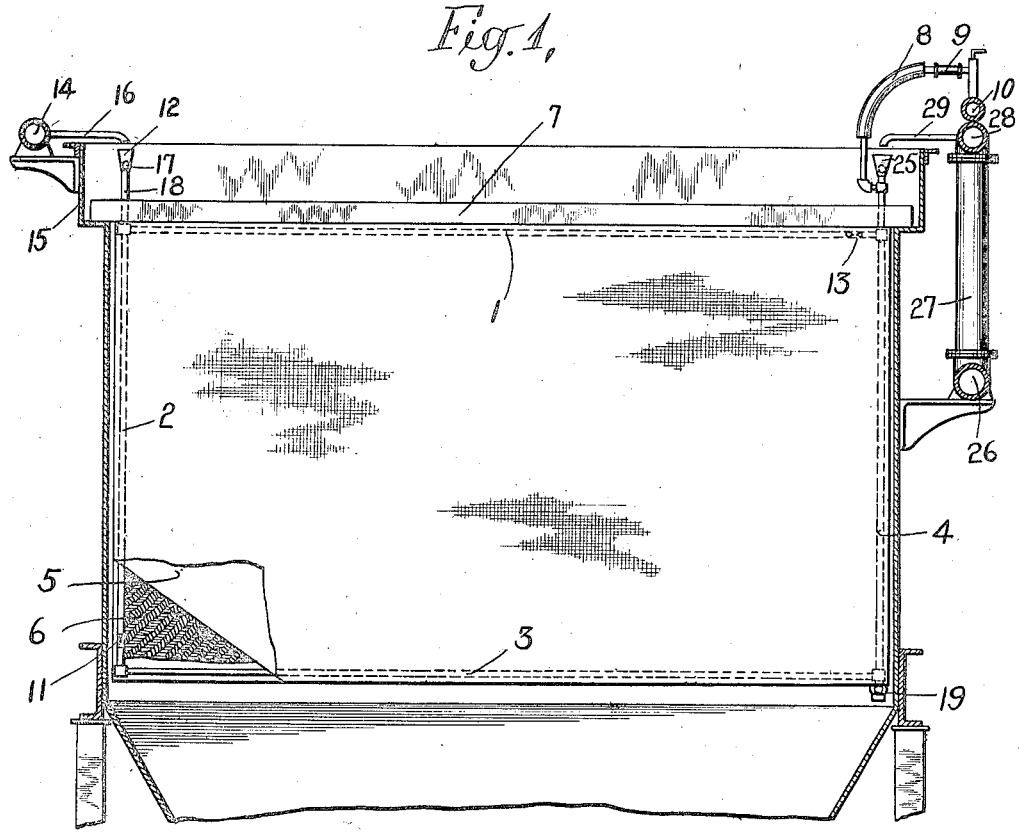
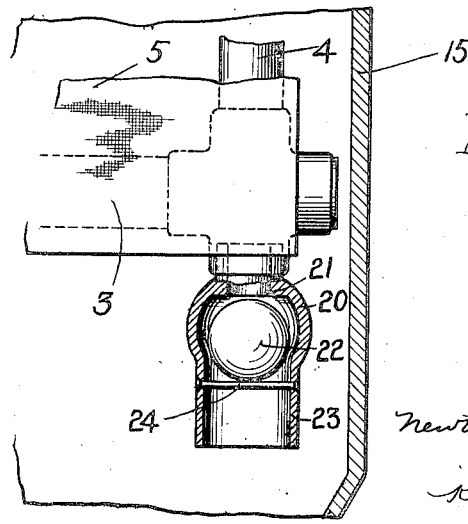
WITNESSES
Adam Schmidt
George Schlatt
INVENTOR,
Newton A. Burgess
BY
Kenyon & Kenyon
his ATTORNEYS

UNITED STATES PATENT OFFICE.

NEWTON A. BURGESS, OF NEW YORK, N. Y., ASSIGNOR TO BUTTERS PATENT VACUUM FILTER COMPANY, INC., A CORPORATION OF NEVADA.

APPARATUS FOR FILTERING VALUABLE COMPOUNDS.

1,103,345.      Specification of Letters Patent.     Patented July 14, 1914.

Application filed September 3, 1913. Serial No. 787,847.

*To all whom it may concern:*

Be it known that I, NEWTON A. BURGESS, a citizen of the United States, and a resident of the city, county, and State of New York, have invented certain new and useful Improvements in Apparatus for Filtering Valuable Compounds, of which the following is a specification.

The object of my invention is the provision of improved apparatus for use in the process of filtering valuable compounds, such as slimes, which result from the well-known cyanid process of treating ores, and which is particularly adapted for use in the process described and claimed in an application of Charles Butters, Serial No. 772,946, filed June 11, 1913. Broadly considered, the process in Butters' application consists in forming a cake on the filter medium by creating suction in the leaf while submerged and discharging the cake by completely filling the leaf, and at the same time equalizing the hydrostatic pressure on the side of the filter media. The apparatus disclosed in said application has among other things, a valve at each lower corner of the leaf adapted to be opened and closed automatically, depending upon the difference in pressure inside and outside the leaf.

It is the object of this invention to improve the leaf by providing a valve which will not become contaminated by the slimes in which the leaf is submerged during the filtering operation, and which will be at the same time automatic in its operation. This desirable effect is accomplished by providing an extension or housing on the valve, the contents of which are equal to, or greater than, the amount of liquid which would necessarily pass through the valve in the opposite direction before the valve would close when suction is applied to the leaf.

Other advantages will be apparent upon reading the following detailed description of the drawing attached hereto, and in which—

Figure 1 shows a complete leaf embodying my invention; and Fig. 2 shows a detailed view of the valve.

As shown in Fig. 1, the leaf comprises a frame having members 1, 2, 3 and 4, preferably of tubing. Over this frame is secured a filter medium 5 of canvas or other suitable material. Inside the filter leaf is a fibrous filler 6, preferably of cocoa mat for holding the sides thereof apart when vacuum is created within the leaf. This filler may be supported by any suitable means such, for instance, as from the top frame member 1. The filter medium 5 may be arranged on the frame in the usual manner and clamped at the top between the headers 7.

The lower frame member 3 is perforated or slotted along its upper side and is connected to a suitable pressure-decreasing means, such as a vacuum pump, through the pipe 4, connection 8, sight-glass 9, pipe 10, by and through which the filtrate is removed.

The left-hand frame member 2 is plugged by any suitable means such as a wooden plug, as shown at 11. The top frame member 1 is perforated or slotted along its lower side, and to this member is attached a suitable relief valve 12. This member is also plugged as shown at 13, and is connected to the right-hand end member to make a rigid frame structure. It is useful to be able to wash out the cocoa-mat occasionally between filtering operations by admitting water from a suitable source through pipe 14 which extends along the length of the vat 15 through the small pipes 16, one of which is supplied for each leaf, and is arranged to empty into the funnel with which the valve 12 is provided. At the time that the water is admitted the valve member such as a ball 17 may be removed from the funnel, unless it is light enough to float, in which case it will be automatically removed from its seat sufficiently to allow the water to be admitted. After the water has passed out of the funnel the valve member will automatically seat. It is not necessary that the relief valve 12 be connected with the frame member 1, but this arrangement is preferred, and it is so illustrated in the drawing. This valve is connected by a pipe 18 of any suitable length. The relief valve should be connected to the upper portion of the leaf in order to allow the escape of air. The provision of an air relief valve to a filter leaf is described and claimed in an application of Charles Butters, Serial No. 769,779, filed May 26, 1913, which is substantially the same as Fig. 1 of the present drawing as far as that feature is concerned.

As shown in Fig. 1, the leaf is provided with a funnel valve at each upper corner. While these valves may be similar in structure they have different functions. The function of the valve at the right-hand corner is to admit water without pressure into the leaf for the purpose of dislodging the cake from the media. The functions of the valve at the left-hand corner are to allow water to run through the leaf for occasionally washing out the cocoa-mat, or other filler after the cake has been dislodged, and to permit air to escape while the leaf is being filled with water from the funnel at the opposite corner during the cake-dislodging step.

The funnel valves at the right-hand corners of the leaves may be dispensed with and water for dislodging the cake supplied through the members 8, if desired. There can be no internal pressure under these circumstances due to the presence of the relief valve at the top of the leaves and the valve 19 at the bottom thereof.

The valve 19 is attached to the lower frame member of the leaf and is adapted to be opened when the pressure within the leaf equals or exceeds the external hydrostatic pressure. This valve is shown in detail in Fig. 2, and comprises a housing 20 having a seat 21 and a valve member 22 adapted to coöperate with the seat so as to prevent the entrance of slimes into the leaf when the pressure within the leaf is decreased. This housing has an extension 23 below the seat, the contents of which, when moved in the inward direction, are sufficient to cause the valve member to seat. The valve member is prevented from falling out of the housing by any suitable means such as member 24. The position of this member is such that the valve member, a ball in this case, will be arrested in its downward motion in such position that a substantial opening will exist between the ball and the side of the housing so as to allow the ready passage of the water out of the valve. The operation of the complete leaf is as follows:—The leaf is submerged in the slimes bath by allowing the bath to run into the vat 15, care being taken not to allow slimes to enter the funnel valves. After the leaves are submerged a few inches, suction is applied to the interior of the leaves by any suitable means, such as a pump. The filtrate is carried off by this pressure-decreasing means through the frame member 4, connections 8 and the pipe 10. As soon as the vacuum is turned on the funnel valves 12 and 25 and the valve 19 will close and seal. Suction is continued until a cake of proper thickness is deposited on the filter surface. This cake may then be variously treated with barren solution and wash water, the valves 12, 25 and 19 remaining sealed throughout these operations. In order to dislodge the cakes, the filter leaves being submerged in wash water, the vacuum is turned off, the valve member is removed from funnel 25, unless it is light enough to float, and water is admitted through the pipes 26, 27, 28 and 29 and funnel 25 into the bottom frame member 3. As the water rises in the leaf the air passes out through the relief valve 12 at the left-hand corner, and thereby the water rises to the very top of the leaf and completely fills it and thereby saturates the entire surface of the filter media. At some point during this filling operation the valve 19 will open if the pressure within the leaf becomes equal to or slightly greater than the outside pressure, and thereby establish communication between the external and internal water whereby the external and internal pressures will be equalized and cakes will then be rapidly dislodged. The filter leaf may then be washed out internally by admitting water through the funnel valve 12 at the left-hand corner and allowing it to discharge through the valve 19 at the lower corner. It will be seen that during this washing step the housing of the valve 19 will be completely filled with clean water and due to the fact that the housing has no openings, except the discharge opening, and the fact that the slimes has a greater specific gravity than the clean water, this housing will be kept filled with clean water, and when it becomes necessary to reduce the pressure within the leaf, the clean water in the housing will tend to flow back into the leaf and will thereby cause the valve member 22 to seat, while at the same time preventing any of the slimes reaching the valve member or its seat. As a result of this the valve is always kept clean, and is made more positive and reliable in its operation, and at the same time no accumulation of dirty slimes gets into the leaf through the valve.

I do not intend to limit myself to the proportions shown, as the housing may take any shape or size required under the circumstances, the object being that the contents of the housing shall be equal to the amount of fluid which would pass through the valve in the reverse direction prior to its closing.

Having described my invention, what I claim as new, and desire to secure by Letters Patent, is:—

1. A filter leaf having automatic valve means with a housing for allowing discharge of clean water from said leaf into slimes when equal internal and external pressures obtain, but preventing entrance of slimes into said leaf when internal pressure is less than external pressure.

2. A filter leaf having a valve for discharging clean water into dirty water, said valve having a projection into said dirty water, the contents of which projection are equal to or greater than the amount which would pass in the reverse direction through said valve before it closes.

3. A filter apparatus having a valve for discharging clean into dirty water, said valve having a projecting housing of notable content on the discharge side thereof.

4. A filter apparatus having a valve for discharging one liquid into another, the latter of which is detrimental to said valve, said valve having an extended housing the contents of which are sufficient to close said valve when passing in reverse direction so as to prevent the entrance of the detrimental liquid to said valve.

5. A filter leaf having submerged pressure equalizing means connected therewith and having a housing of notable content and length.

6. A filter leaf having automatic hydrostatic pressure equalizing means connected thereto and having a housing of notable content and length.

7. A filter leaf having a submerged pressure equalizing valve connected thereto and having a housing of notable content and length.

8. A filter leaf having a submerged automatic pressure equalizing valve connected thereto and having a housing of notable content and length.

9. A filter leaf having a hydrostatic pressure equalizing valve connected with a submerged portion thereof and having a housing of notable content and length.

In testimony whereof, I have signed my name to this specification, in the presence of two subscribing witnesses.

NEWTON A. BURGESS.

Witnesses:
ADAM SCHMIDT,
EDWIN SEGER.